United States Patent [19]

Sato

[11] Patent Number: 4,616,001
[45] Date of Patent: Oct. 7, 1986

[54] ACTIVATED CARBON

[76] Inventor: Eiichi Sato, 1857 Kami-iida-cho, Totsuka-ku, Yokohama-shi, Japan

[21] Appl. No.: 756,610

[22] Filed: Jul. 19, 1985

[30] Foreign Application Priority Data

Jun. 21, 1985 [JP] Japan ................................. 60-136323

[51] Int. Cl.$^4$ ........................ B01J 20/20; C01B 31/10
[52] U.S. Cl. .................................... 502/437; 502/432; 502/433
[58] Field of Search ........................ 502/437, 432, 433

[56] References Cited

FOREIGN PATENT DOCUMENTS 515100 12/1917 France ................................. 502/437
650256 3/1928 France ................................. 502/437

Primary Examiner—P. E. Konopka
Attorney, Agent, or Firm—Cushman, Darby & Cushman

[57] ABSTRACT

The present invention is directed to an activated carbon made from macadamia nuts. The macadamia nuts each comprise an outer husk, a shell and a kernel. The shell is used as a material of the activated carbon. The shell is separated from the husk and the kernel and subjected to carbonization and activation processes to obtain the activated carbon.

5 Claims, 1 Drawing Figure

ACTIVATED CARBON

BACKGROUND OF THE INVENTION a. Field of the Invention

This invention relates to an activated carbon, and more particularly to an activated carbon made from macadamia nuts.

b. Prior Arts

Activated carbon is widely used, for example, for removal of impurities, capture or recovery of specific components, separation of mixtures, or the like, by utilizing its remarkable adsorptivity, and the demand for the activated carbon has been increased year by year. In fact, the demand has exceeded the supply for these years. Especially, activated carbon of good quality is in serious shortage.

Heretofore, the activated carbon is made of coconut shell, vegetable coal, sawdust, wood chip, or the like. Recently, it has been proposed to use pulp waste as a raw material of the activated carbon (Japanese Patent Application Laid-Open Specification No. 48-20793).

The activated carbon is produced from these materials through carbonization and activation processes after some preliminary treatment or without such pretreatment.

The properties of the activated carbons are determined by the qualities of the materials employed as well as the activation conditions. Therefore, good quality materials are sought for.

c. Problems to Be Solved by the Invention

The most outstanding problem in the production of the activated carbon is acquirement of the materials. While good-quality materials are needed as described above, the good-quality materials such as coconut shell are produced only at local areas on the world and the increase of the production can not be expected easily. This makes the material supply unsteady and the material price increased.

The second task is to prepare activated carbon of high regeration efficiency. The used activated carbon is regenerated for re-use to substantially reduce the cost of the activated carbon. For this reason, it is needed to produce activated carbon of little ash content and having a high regeneration efficiency. Such activated carbon can hardly be obtained from such materials as saw dusts or wood chips but only obtained from the good-quality materials such as coconut shells. However, there is again a problem that the supply of such good-quality materials are limited.

The third task is to reduce the cost of the activated carbon. As described above, the cost of the activated carbon has recently been raised due to the rising cost of the materials. For this reason, the possibility of the use of cheaper materials has been discussed. The materials such as saw dusts, wood chips or pulp wastes are advantageously cheap in cost, but they have such a problem that the quality of the activated carbon obtained from these materials is rather poor. In addition, in case of the pulp wastes, complicated pretreatment is needed, which raises the manufacturing cost. Thus, it is very difficult to economically obtain activated carbon of good quality.

SUMMARY OF THE INVENTION

It is therefore an object of the present invention to provide an activated carbon of good quality, containing little ash and having a large regeneration effeciency, whose material can be supplied easily and steadily and which can be manufacturing easily and economically.

In accordance with the present invention, there is provided an activated carbon made from shells removed from macadamia nuts and subjected to carbonization.

PREFERRED EMBODIMENT OF THE PRESENT INVENTION

Figure 1:
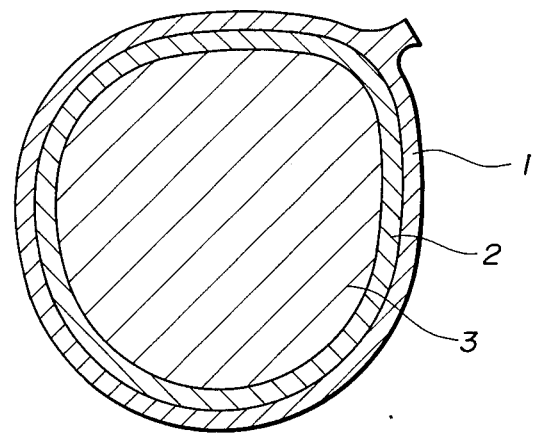
FIG. 1 is a sectional view of a macadamia nut used for the activated carbon of the present invention.

The macadamia tree is a subtropical evergreen of the Proteaceae family growing in Hawaii and Australia. There are two species of macadamias that produce edible nuts: *Nacadamia integrifolia* and *Macadamia tetraphylla*. Both speceis may be employeable for the present invention, but the *Macadamia integrifolia* is proven to be suitable for large-scale production of activated carbon.

The macadamia nut has an outer diameter of 20 to 25 mm and has a structure as illustrated in FIG. 1. Stated more illustratively, the mature nutlet has a husk 1 on the outer surface thereof, a hard seed coat, i.e. a shell 2 of 2 to 3 mm in thickness and a karnel 3 in the core thereof. The present invention employs the shell 2.

The kernel contains oil and sugar and has fine textural qualities and a sweet creamy taste, and it is in high demand as a high-quality nut. For this reason, the manufacturing cost of the macadamia nut is substantially paid for the kernel. Thus, the shell is only a waste of the macadamia nut product and it costs substantially nothing.

The macadamias begin producing nuts approximately four to five years after transplanting. The trees continue to bear nuts for many years and can steadily provide the nuts of high quality at a high yield. Thus, the supply of the shells of the macadamia nuts can be made steadily at a low cost as different from other natural material such as coconut shells.

The preparation of the activated carbon from the macadamia nuts is carried out as follows:

The harvested nuts are sent to a dehusker to remove husks 1. Then, the nuts are cracked by metal rollers to remove hard brown shells 2. The pressure of the rollers applied to crack the shells is, for example, about 2,000 kg/cm$^2$. For removing of the shells 2 from the kernels, an appropriate separating means such as optical or mechanical equipment may be used. The separated shells 2 are, then, subjected to sieving to remove debris or forein matters and supplied to a carbonizing process. On the other hand, the kernels are fed to roasting and salting processes.

The obtained shells 2 are then subjected to the carbonization. The carbonization may be carried out by using a known carbonizing oven of a simple structure such as beehive oven or effecting the coking of the material charged in a hole digged in the ground.

The carbonization is effected by coking the shells of the macadamia nuts at a temperature of 400° to 900° C. At this time, it is desirable to effect pyrolysis quickly to shorten the time the resulting carbon is in contact with the decomposition products.

The carbonized materials are then activated. The activation is effected by treating the carbonization products under the conditions where an activating agent may react with the carbons. By this process, carbon having a large adsorptivity can be obtained. Although the activation may be effected in various ways, a gas activation which is simple and effective is employed in the present invention.

As an example of the gas activating agents, there can be generally mentioned steam, carbon dioxide, air or a mixture thereof. Among these gas activating agents, steam is the most effective and therefore steam is used advantageously in the present invention.

The activation is made at a high temperature, for example, at a temperature as high as 900° C. for several tens of minutes.

By such an activation treatment, the free carbons are preferentially consumed so that the closed micro pores in the crystalline materials are opened and the specific surface area is highly increased. In addition, the carbons within the crystalline materials are also consumed so that the existing pores are enlarged and further pores are newly formed. These enhance the adsorptivity.

EXAMPLE 1,000 g of shells of macadamia nuts which have been separated from the kernels were coked by a carbonizing oven at a temperature of 600° C. for 3 hours. The resulting charcoal products are activated by using steam at a temperature of 900° C. for 120 minutes to obtain 200 g of activated carbon.

In comparison, 1,000 g of coconut shells were treated in the manner substantially the same as the above to obtain 180 g of activated carbon.

The result of the comparison between the example of the present invention and the comparative example is shown in the following table. The yield is shown in the terms of ratio of the weight of the activated carbon obtained to the weight of the material before carbonization. The specific surface area is obtained by N BET method (77° K., $a_m$ ($N_2$) = 16.2 Å$^2$).

|  | Yield | Ash Content | Spec. Surf. Area |
|---|---|---|---|
| Example | 20% | 0.5% | 1320 m$^2$/g |
| Comp. EX. | 18% | 1.2% | 1200 m$^2$/g |

As described above, according to the present invention, the shells of the macadamia nuts are used as the materials for the activated charcoal. By this, steady supply of the materials for the activated carbon can be assured and activated carbon of high quality can be produced easily at a low cost. The obtained activated carbon contains little ash and has a high regeneration efficiency.

I claim:

1. Activated carbon which is made of carbonized shells of macadamia nuts separated from kernels thereof.

2. Activated carbon according to claim 1 which has been prepared by coking the shells followed by activation and with at least one member of the group consisting of steam, air, carbon dioxide about 900° C.

3. A process of preparing activated carbon from macadamia nut shells comprising coking the shells followed by activating the carbon formed by treating it at 900° C. with at least one member of the group consisting of steam, air and carbon dioxide.

4. A process according to claim 3 wherein the activation is carried out with steam.

5. Activated carbon according to claim 1 having an ash content of about 0.5% and a specific surface area of about 1320 m$^2$/g.

* * * * *